US010224731B2

United States Patent
Honkura (10) Patent No.: US 10,224,731 B2
(45) Date of Patent: Mar. 5, 2019

(54) METHOD OF CONTROLLING SECONDARY BATTERY

(71) Applicant: Hitachi, Ltd., Chiyoda-ku, Tokyo (JP)

(72) Inventor: Kohei Honkura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 14/884,173

(22) Filed: Oct. 15, 2015

(65) Prior Publication Data

US 2016/0118816 A1   Apr. 28, 2016

(30) Foreign Application Priority Data

Oct. 17, 2014   (JP) ................................ 2014-212185

(51) Int. Cl.
- *H02J 7/00* (2006.01)
- *H01M 10/44* (2006.01)
- *H01M 10/48* (2006.01)
- *H01M 10/42* (2006.01)

(52) U.S. Cl.
CPC .............. *H02J 7/007* (2013.01); *H01M 10/44* (2013.01); *H01M 10/48* (2013.01); *H01M 2010/4271* (2013.01)

(58) Field of Classification Search
USPC ................................................. 320/134–136
See application file for complete search history.

(56) References Cited

U.S. PATENT DOCUMENTS

| | | | | |
|---|---|---|---|---|
| 2008/0122399 A1* | 5/2008 | Nishino | ................ | H02J 7/0075 320/103 |
| 2014/0111164 A1* | 4/2014 | Ohkawa | .............. | H01M 10/441 320/134 |
| 2014/0184166 A1* | 7/2014 | Ohkawa | .............. | H01M 10/441 320/134 |
| 2014/0339891 A1* | 11/2014 | Ohkawa | ................ | H01M 10/44 307/9.1 |
| 2015/0108991 A1* | 4/2015 | Aoshima | ............ | G01R 31/3634 324/430 |
| 2017/0018807 A1* | 1/2017 | Kishi | ................ | H01M 10/0525 |

FOREIGN PATENT DOCUMENTS

| | | |
|---|---|---|
| EP | 2 053 414 A2 | 4/2009 |
| JP | 2009-80093 A | 4/2009 |

OTHER PUBLICATIONS

Machine Translation of JP2006-345634.*

* cited by examiner

*Primary Examiner* — Samuel Berhanu
(74) *Attorney, Agent, or Firm* — Crowell & Moring LLP (57) ABSTRACT

A positive electrode potential and a negative electrode potential during charge or discharge of a secondary battery are determined, based on potentials of a positive electrode and a negative electrode in an open circuit state corresponding to a SOC of the secondary battery, and internal resistances of the positive electrode and the negative electrode corresponding to the SOC of the secondary battery, and a current of the secondary battery is controlled such that the positive electrode potential and the negative electrode potential fall within a predetermined range.

5 Claims, 8 Drawing Sheets

METHOD OF CONTROLLING SECONDARY BATTERY

BACKGROUND OF THE INVENTION

1. Field of the Invention

The present invention relates to a method of controlling a secondary battery.

2. Description of the Related Art

In recent years, approaches to efficiently use energy by use of secondary batteries such as lithium ion batteries, as vehicle on-board power supplies or power supplies for power storage of smart houses have been made. However, the secondary batteries are known to cause characteristic deterioration by charge/discharge or storage. The power supplies of the above intended purposes are expected to be used for a long time. Therefore, it is important to suppress the characteristic deterioration of the secondary batteries. Further, it is important to continuously use the secondary batteries in a safe manner.

The characteristic deterioration and a decrease in safety of the secondary batteries are known to be quickly advanced when voltages of the secondary batteries are too high or too low. In reality, the voltage of the secondary battery is mere a difference between a positive electrode potential and a negative electrode potential of the secondary battery, and the speed of the characteristic deterioration and the decrease in safety is determined by the positive electrode potential and the negative electrode potential, rather than the battery voltage. Therefore, as means for suppressing the deterioration, it is effective to accurately detect the positive and negative electrode potentials in the secondary battery, and to select an optimum method of using the battery according to the detected potentials.

For example, JP-2009-80093-A describes a method of quantitatively evaluating deterioration states of positive and negative electrodes and an electrolytic solution in a nondestructive manner, by using a charge/discharge curve of a secondary battery, and determining open circuit potentials of the positive electrode and the negative electrode.

SUMMARY OF THE INVENTION

The method of determining a state of a secondary battery described in JP-2009-80093-A is a method of analyzing the charge/discharge curve not including an influence of internal resistances. Therefore, it is not possible to determine a resistance of the positive electrode and a resistance of the negative electrode that occupy the internal resistance of the battery. Therefore, the method of controlling a secondary battery described in JP-2009-80093-A is a method not based on the internal resistances of the positive electrode and the negative electrode, and a positive electrode potential and a negative electrode potential during charge/discharge of the secondary battery. Therefore, there is a problem that the method has limited improvement effect of the suppression of deterioration of the safety and the characteristic of the secondary battery.

The present invention has been made in view of such a problem, and an objective is to provide a method of controlling a secondary battery, which realizes high safety of the secondary battery and suppression of characteristic deterioration, based on internal resistances of a positive electrode and a negative electrode of the secondary battery.

At least one of a positive electrode potential and a negative electrode potential during charge or discharge of the secondary battery is determined based on potentials of a positive electrode and a negative electrode in an open circuit state corresponding to a state of charge (SOC) of the secondary battery, and internal resistances of the positive electrode and the negative electrode corresponding to the SOC of the secondary battery, and a current, an input, or an output of the secondary battery is controlled such that at least one of the positive electrode potential and the negative electrode potential falls within a predetermined range.

According to the present invention, by control of a secondary battery, based on a positive electrode potential and a negative electrode potential during charge/discharge of the secondary battery, a method of controlling a secondary battery, which can enhance safety of the secondary battery and suppress characteristic deterioration can be provided.

DESCRIPTION OF THE PREFERRED EMBODIMENTS

Hereinafter, embodiments of the present invention will be described using drawings. In all of the drawings for describing the present invention, elements having the same function are denoted with the same reference sign, and repetitive description thereof may be omitted.

First Embodiment

Figure 1:
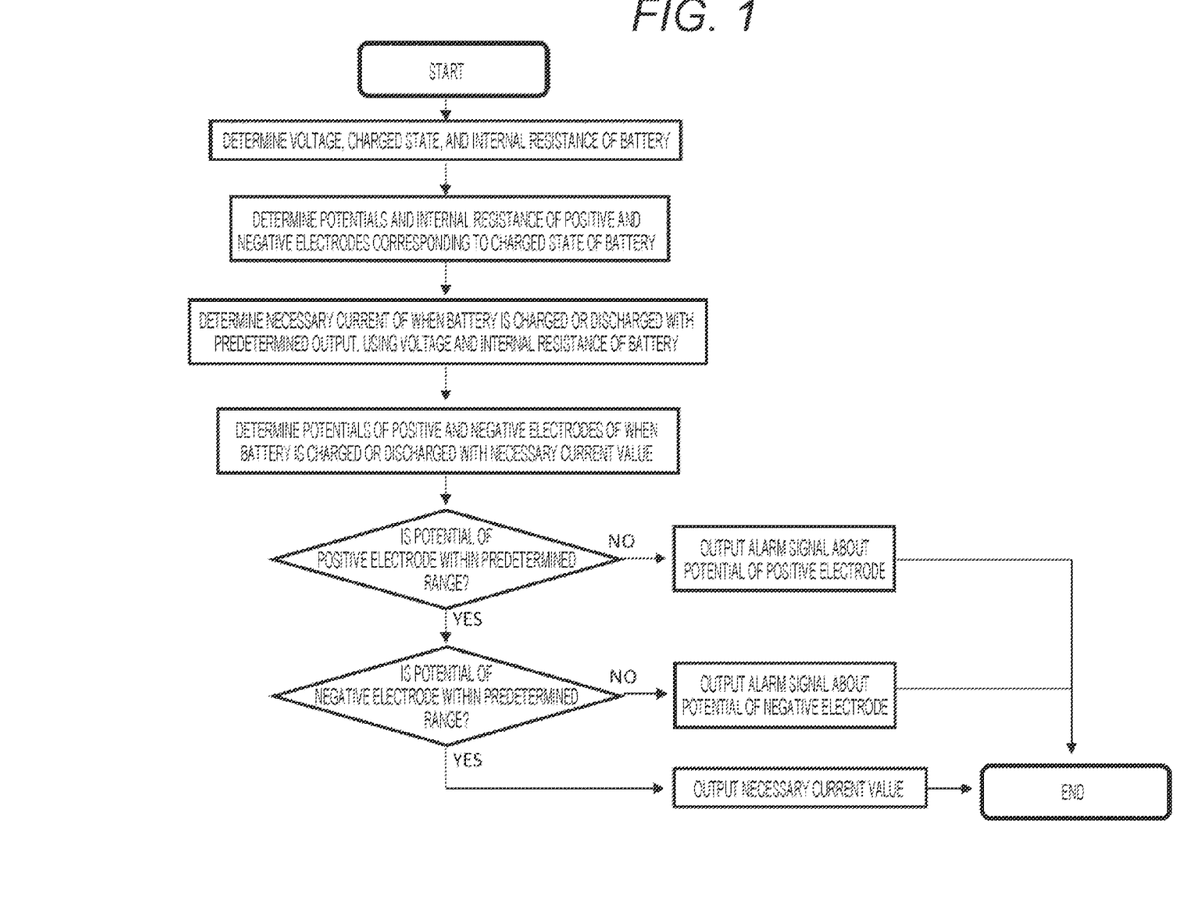
FIG. 1 illustrates a flowchart of control of a secondary battery in an embodiment of the present invention.

Hereinafter, an operation in a method of controlling a secondary battery of the present invention will be specifically described with reference to FIG. 1. FIG. 1 is a flowchart of control of a secondary battery in an embodiment of the present invention.

In the present embodiment, for a SOC of the secondary battery, a data table in which a battery voltage, an open circuit potential of a positive electrode, an open circuit potential of a negative electrode, an internal resistance of the battery, an internal resistance of the positive electrode, and an internal resistance of the negative electrode are associated with each other is provided in a control device. As the SOC of the battery in this data table, for example, a method of dividing a discharge capacity from a fully charged state to a totally discharged state into 100 parts, and expressing the fully charged state as 100 and the totally discharged state as 0. Alternatively, there is a method of using a discharge amount from the fully charged state, or a charge amount from the totally discharged state, as the SOC. Further, the open circuit potentials of the positive and negative electrodes in this data table are desirably potentials to a reference potential indicated by a common reference electrode. As the reference electrode, it is desirable to use metal lithium, lithium titanate, or lithium iron phosphate in a non-aqueous electrolyte solution. Further, as the internal resistances of the battery, the positive electrode, and the negative electrode, values to at least one discharge time or charge time are indicated. Desirably, values to two or more discharge times or charge times are indicated. Most desirably, the internal resistances of the battery, the positive electrode, and the negative electrode are expressed as functions with respect to the discharge time and the charge time. Functional types thereof are common regardless of the SOC, and a value of a coefficient is held for each SOC. For example, an internal resistance $Rp(x, t)$ of the positive electrode with respect to a SOC x of the battery and a discharge time t is expressed by:

$$Rp(x,t)=a(x)+b(x)*t$$

Values of a and b are held in the data table. The internal resistances of the battery and the negative electrode are similarly held.

In actual control, first, the SOC of the secondary battery is determined. As a determination method, there is a method of measuring an open circuit voltage of the secondary battery, and then determining the SOC of the secondary battery, using the data table that indicates a relationship between a predetermined SOC and the open circuit voltage or a function. Further, there is a method of integrating a discharge electricity amount and a charge electricity amount from a predetermined SOC of the secondary battery, and determining the SOC of the secondary battery, using a ratio of the integrated value and a capacity of the secondary battery, which serves as a reference. Further, there is a method of determining the SOC of the secondary battery in combination of these two methods.

Next, the open circuit potentials of the positive and negative electrodes and the internal resistance of the positive and negative electrodes with respect to the SOC of the secondary battery are determined by reference to the data table. As a determination method of when a value that is the same as a value of the SOC of the present secondary battery does not exist in the data table, there is a method of determining the open circuit potentials of the positive and negative electrodes and the internal resistances of the positive and negative electrodes corresponding to the present SOC, by interpolation using a minimum SOC exceeding the present SOC, a maximum SOC falling below the present SOC, and the open circuit potentials of the positive and negative electrodes and the internal resistances of the positive and negative electrodes corresponding to the maximum and minimum SOC.

Next, an input or output P0 required by an external device, and a necessary current I0 for satisfying a duration time t0 of the input or output P0 are determined. An example of a determination method will be described. The SOC of the secondary battery determined in the previous step is x0, and a corresponding voltage of the secondary battery in the data table is V0, the internal resistance after the time t0 is $R(x0, t0)$. A voltage after the time t0 is $V0-R(x0, t0)*I0$. Therefore, for the input or output P0, $P0=V0*I0-R(x0, t0)*I0^2$ is obtained, and thus this quadratic equation is solved about the I0, and the I0 can be determined.

Next, a maximum value of the positive electrode potential and a minimum value of the negative electrode potential during charge, or a minimum value of the positive electrode potential and a maximum value of the negative electrode potential during discharge are determined based on the determined charge current value or discharge current value I0, the open circuit potentials and the internal resistances of the positive and negative electrodes determined in the previous step. As an example, a procedure to obtain the maximum potential of the positive electrode during charge will be described. The SOC of the secondary battery of a current point of time determined in the previous step is x0. Meanwhile, the open circuit potential of the positive electrode given in the data table is Vp0. Further, the internal resistance of the positive electrode is given as $a(x)+b(x)*t$, and a case where the $a(x)$ and the $b(x)$ are positive values will be described. Further, a required charge current is I0, and the charge time is t0. In this case, first, the maximum value $I0*[a(x0)+b(x0)*t0]$ of a potential increase of the positive electrode side during charge is calculated. Next, the maximum value $Vp0+I0*[a(x0)+b(x0)*t0]$ of the positive electrode potential during charge is calculated. The minimum value of the positive electrode potential during discharge, the minimum value of the negative electrode battery during charge, and the maximum value of the negative electrode potential during discharge can also be obtained by a similar procedure.

Another method that takes change of the SOC of the secondary battery due to charge or discharge into account, which is a more precise method, will be described using a case of determining the positive electrode potential during charge, as an example. First, a SOC x1 of the secondary battery after charge is determined. The SOC x1 can be obtained from the required charge electricity amount I0*t0, and a SOC x0 before charge. For example, when the SOC is given as a charge electricity amount from the totally discharged state in the data table, for example, $x1=x0+I0*t0$ is obtained. Next, a positive electrode potential Vp1 corresponding to the SOC x1 is determined. Then, the maximum value of the positive electrode potential during charge is calculated as $Vp1+I0*[a(x0)+b(x0)*t0]$. The minimum value of the positive electrode potential during discharge, the minimum value of the negative electrode battery during charge, and the maximum value of the negative electrode potential during discharge can also be obtained by a similar procedure.

Next, the obtained maximum value of the positive electrode potential during charge, or the obtained minimum value of the positive electrode potential during discharge is compared with a predetermined upper limit or lower limit of the positive electrode potential. If the obtained maximum value of the positive electrode potential during charge is the upper limit or more, or the minimum value of the positive electrode potential during discharge is the lower limit or less, an alarm signal is output, and a required current value is not output. Otherwise, the procedure proceeds to a next step.

Next, the obtained minimum value of the negative electrode potential during charge, or the obtained maximum value of the negative electrode potential during discharge is compared with a predetermined lower limit or upper limit of the negative electrode potential. If the obtained minimum value of the negative electrode potential during charge is the lower limit or less, or the obtained maximum value of the negative electrode potential during discharge is the upper limit or more, an alarm signal is output, and a required current value is not output. Otherwise, the required current value is output, and the series of control is terminated.

According to the above description, the control of the secondary battery based on the positive and negative electrode potentials of the secondary battery during charge or discharge can be performed. Accordingly, it becomes possible to use the secondary battery while reliably avoiding a positive electrode potential region and a negative electrode potential region in which the characteristic deterioration and a decrease in safety of the secondary battery are accelerated, and the high safety and life prolongation of the secondary battery can be realized.

Second Embodiment

Another embodiment of control of a secondary battery according to the present invention will be described. In the present embodiment, a SOC of a secondary battery, and opening circuit potentials of positive and negative electrodes and internal resistances of the positive and negative electrodes are associated based on a measured data table made of the SOC of the secondary battery, a corresponding battery voltage, and a corresponding internal resistance of the battery. Then, a control device creates an extended data table configured from the SOC of the secondary battery, the corresponding battery voltage and the corresponding internal resistance of the battery, the open circuit potentials of the positive and negative electrodes, and the internal resistances of the positive and negative electrodes. Following that, control described in the first embodiment is performed using the extended data table.

Figure 2:
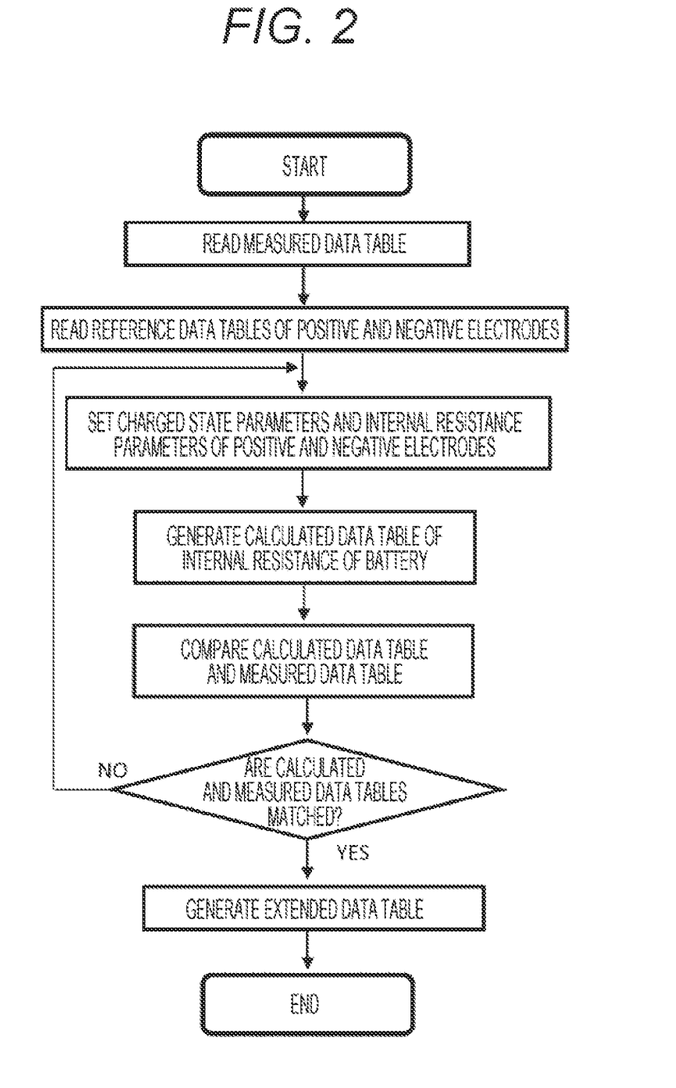
FIG. 2 illustrates a flowchart of creating a data table of a secondary battery in an embodiment of the present invention.

FIG. 2 is a flowchart illustrating a procedure of generating the extended data table, based on the measured data table. First, the measured data table of the secondary battery is read. Next, reference data tables of the positive and negative electrodes of the secondary battery are read. Next, SOC parameters and internal resistance parameters of the positive and negative electrodes are set, and a calculated data table of the secondary battery is generated. This calculated data table is compared with the measured data table, and if these tables are not matched, the SOC parameters and the internal resistance parameters of the positive and negative electrodes are set again, and the calculated data table of the secondary battery is generated. This process is repeated until the calculated data table and the measured data table are matched, and after that, the extended data table of the secondary battery is created, and the procedure is terminated. Hereinafter, details of individual steps will be described.

First, the measured data table of the secondary battery is read. In the measured data table of the secondary battery, at least four sets, desirably, twenty sets or more of combinations of a SOC x of the secondary battery, a voltage V of the secondary battery, and an internal resistance R of the secondary battery are included. The measured data table is separately created. As a method of creating the measured data table, there is a following method. That is, the secondary battery is charged in a fully charged state by a predetermined method in advance. From the state, the secondary battery is discharged for a predetermined time with a predetermined current, and the discharge is paused for a predetermined time. Following that, the secondary battery is discharged for a predetermined time with a predetermined current, and the discharge is paused for a predetermined time, again. The same operation is further repeated until the secondary battery reaches a totally discharged state.

Figure 3:
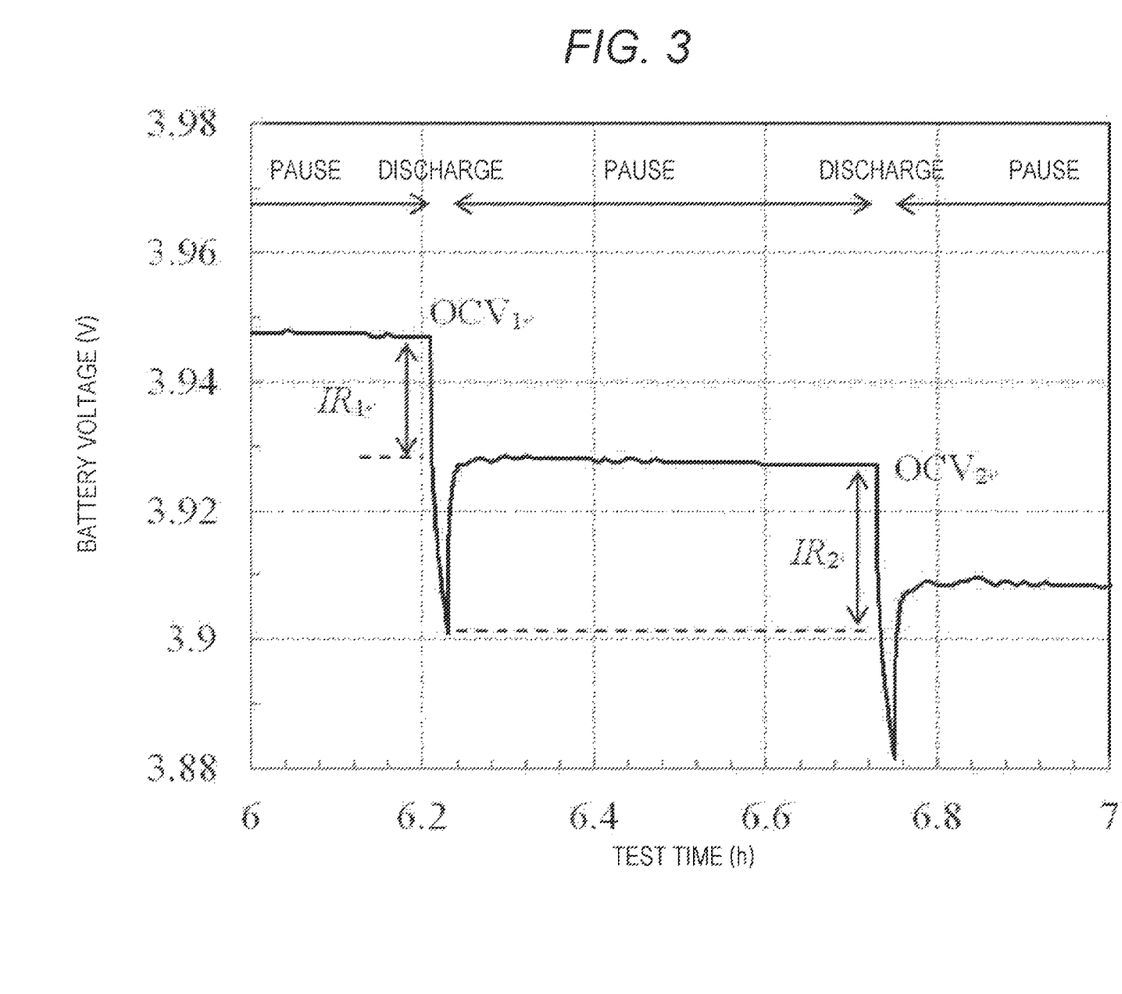
FIG. 3 illustrates a measurement example of a data table of a secondary battery in an embodiment of the present invention.

FIG. 3 illustrates a part of change of the battery voltage at the time of measurement. As illustrated in FIG. 3, the battery voltage during a pause is an open circuit voltage OCV, and the internal resistance R of the battery can be measured from the battery voltage during discharge. As the internal resistance R, an internal resistance R1 based on an OCV1 before discharge, an internal resistance R2 based on an OCV2 during a pause after discharge, or both of the internal resistances R1 and R2 may be used. Further, a value of the internal resistance R1 is changed according to a discharge time t. The internal resistance R1 may just be measured for at least one arbitrary discharge time. The internal resistance R1 is desirably measured for two or more discharge times, and most desirably measured as a function R1(t) with respect to the discharge time t. In the present embodiment, a case in which the internal resistances R1 and R2 after the discharge time of one second will be described.

Next, the reference data tables of the positive and negative electrodes are read. Here, the reference data table of the positive electrode is made of a combination of a SOC xp of the positive electrode, which is separately defined from the SOC x of the battery, and an open circuit potential Vp and an internal resistance Rp of the positive electrode corresponding to the SOC xp of the positive electrode. Further, the reference data table of the negative electrode is made of a combination of a SOC xn separately defined from the SOC x of the battery and the SOC xp o the positive electrode, and an open circuit potential Vn and an internal resistance Rn of the negative electrode corresponding to the SOC xn of the negative electrode. The reference data tables of the positive electrode and the negative electrode include at least four sets, desirably 20 sets or more of these combinations. The reference data tables of the positive electrode and the negative electrode are separately created. At that time, the reference data tables may just be created according to the method of creating the measured data table of the secondary battery, using a model cell prepared by a combination of the positive electrode or the negative electrode, and a reference electrode with a constant potential. In the present embodiment, a case in which internal resistances Rp1 and Rn1 after one seconds after start of discharge, using the open circuit potentials before discharge as references, and internal resistances Rp2 and Rn2, using the open circuit potentials during a pause after discharge as references, are used as the internal resistances Rp and Rn of the positive and negative electrodes will be described.

Figure 4:
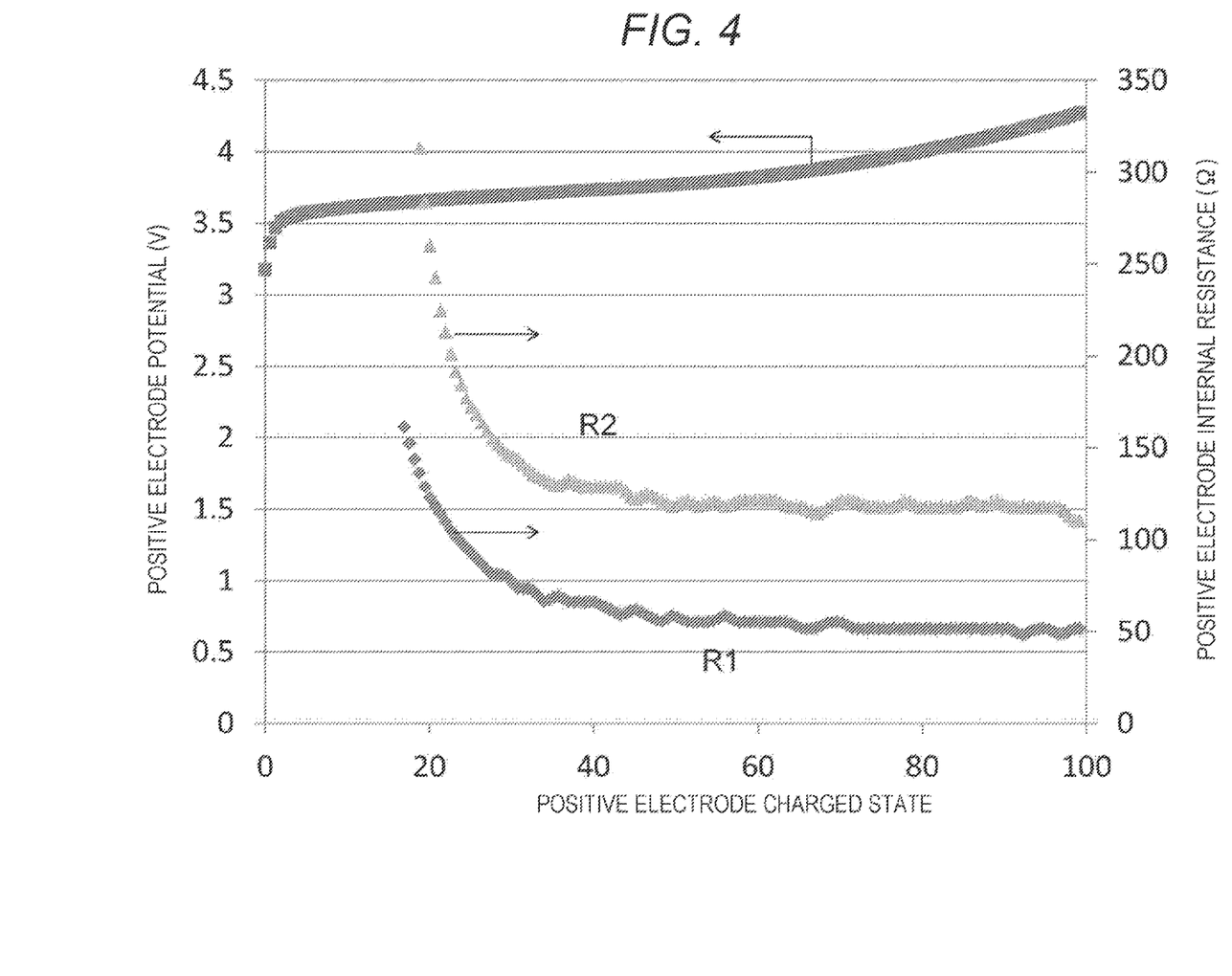
FIG. 4 illustrates a data table of a positive electrode in an embodiment of the present invention.
Figure 5:
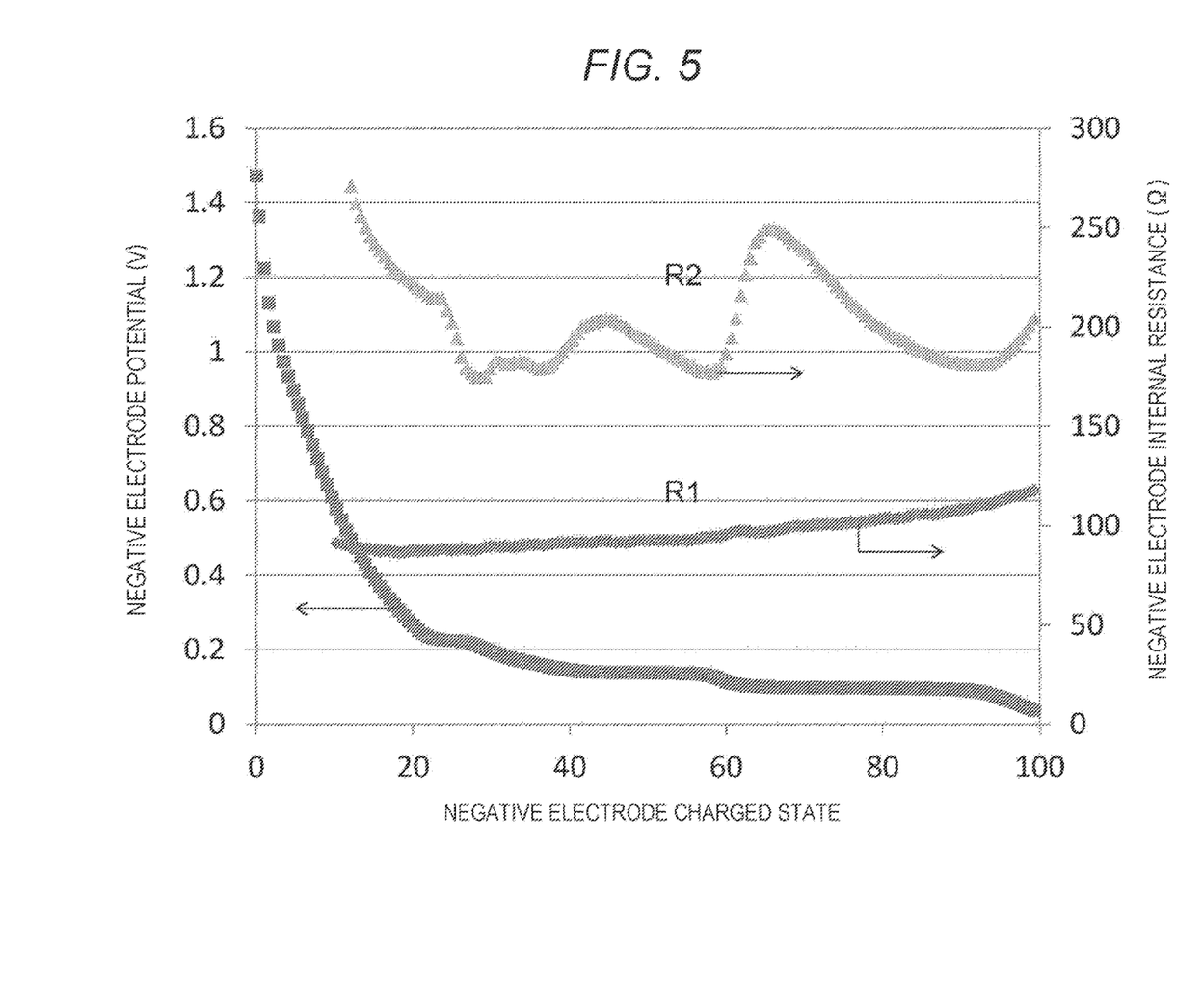
FIG. 5 illustrates a data table of a negative electrode in an embodiment of the present invention.

FIG. 4 is a reference data table of a positive electrode created using a lithium ion battery as the secondary battery, and based on a measurement result using the positive electrode of the lithium ion battery. FIG. 5 is a reference data table of a negative electrode created base on a measurement result using the negative electrode.

Next, values of the SOC parameters of the positive and negative electrodes, and values of the internal resistance parameters are set. Here, the SOC parameters and the internal resistance parameters may be arbitrarily determined to be able to calculate a relationship between the SOC and the internal resistance of the secondary battery in combination with the reference data tables of the positive and negative electrodes. In the present embodiment, an example of using mp, mn, dp, dn, r0, ap, and an, as coefficients, will be described. Meaning of these coefficients will be described below. In the present step, arbitrary values of these coefficients are determined within appropriate ranges.

Next, the calculated data table of the battery is created. The calculated data table of the battery includes at least four sets, desirably twenty sets or more of combinations of the SOC x of the secondary battery, the voltage V of the secondary battery, and the internal resistance R of the secondary battery, similarly to the measured data table of the battery. Hereinafter, an example of a method of creating the calculated data table will be described. First, the SOC x of the battery can be calculated by an expression $x=xp*mp+dp=xn*mn+dn$, using the SOC xp of the positive electrode and the SOC xn of the negative electrode corresponding to the SOC x of the battery, and the coefficients mp, mn, dp, and dn. Further, a voltage V(x) of the battery corresponding to the SOC x of the battery can be calculated by an expression $V(x)=Vp(xp)-Vn(xn)$, using an open circuit potential Vp(xp) of the positive electrode corresponding to the SOC xp of the positive electrode, and an open circuit potential Vn(xn) of the negative electrode corresponding to the SOC xn of the negative electrode. Further, an internal resistance R(x) of the battery corresponding to the SOC x of the battery can be calculated by an expression $R(x)=r0+ap*Rp(xp)+an*Rn(xn)$, using an internal resistance Rp(xp) of the positive electrode corresponding to the SOC xp of the positive electrode, an internal resistance Rn(xn) of the negative electrode corresponding to the SOC xn of the negative electrode, and the coefficients r0, ap, and an. The SOC x of the secondary battery, the battery voltage V(x) and the internal resistance R(x) corresponding to the SOC x of the secondary battery can be obtained by the above expressions.

Next, the calculated data table of the secondary battery and the measured data table of the secondary battery are compared. A method of comparison and indexes may be appropriately determined. As the indexes, for example, the squares of differences between a voltage Vm(xi) and an internal resistance Rm(xi) in the measured data table corresponding to a certain SOC xi, and a voltage Vc(xi) and an internal resistance Rc(xi) in the calculated data table: $(Vm(xi)-Vc(xi))^2$ and $(Rm(xi)-Rc(xi))^2$ are calculated for all of SOC included in the measured data table, and respective sums $\Sigma[(Vm(xi)-Vc(xi))^2]$ and $\Sigma[(Rm(xi)-Rc(xi))^2]$ can be used.

Next, the degree of matching between the calculated data table and the measured data table of the secondary battery is determined, based on the indexes of comparison calculated in the previous step. As a result of determination, when the both tables are matched, the step is moved onto a next step. Otherwise, the SOC parameters and the internal resistance parameters of the positive and negative electrodes are set again, the calculated data table of the secondary battery is created, and the calculated data table and the measured data table are compared. A reference of determination may be appropriately determined. For example, values of the indexes being thresholds or less may be employed as the reference. Alternatively, the values of the indexes being not improved even if a series of procedures including setting of the SOC parameters and the internal resistance parameters of the positive and negative electrodes, creation of the calculated data table of the secondary battery, and comparison between the calculated data table and the measured data table is repeated several times may be employed as the determination reference.

Next, the extended data table of the secondary battery is created. The open circuit voltage V of the battery, the internal resistances R1 and R2 of the battery, the SOC $xp=(x-dp)/mp$ of the positive electrode, the open circuit potential Vp(xp) of the positive electrode, the internal resistance $ap*Rp1(xp)$, $ap*Rp2(xp)$ of the positive electrode, the SOC $xn=(x-dn)/mn$ of the negative electrode, the open circuit potential Vn(xn) of the negative electrode, the internal resistance $an*Rn1(xn)$, $an*Rn2$ of the negative electrode, corresponding to the SOC x of the secondary battery, have been obtained by the calculation so far. Further, the coefficients mp, mn, dp, dn, r0, ap, and an without depending on the SOC x of the secondary battery have been obtained. Therefore, the extended data table for different SOC of the second battery, including at least two sets, desirably twenty or more sets of data, where a combination of necessary values of the aforementioned values is treated as one set of data, is created.

Figure 6:
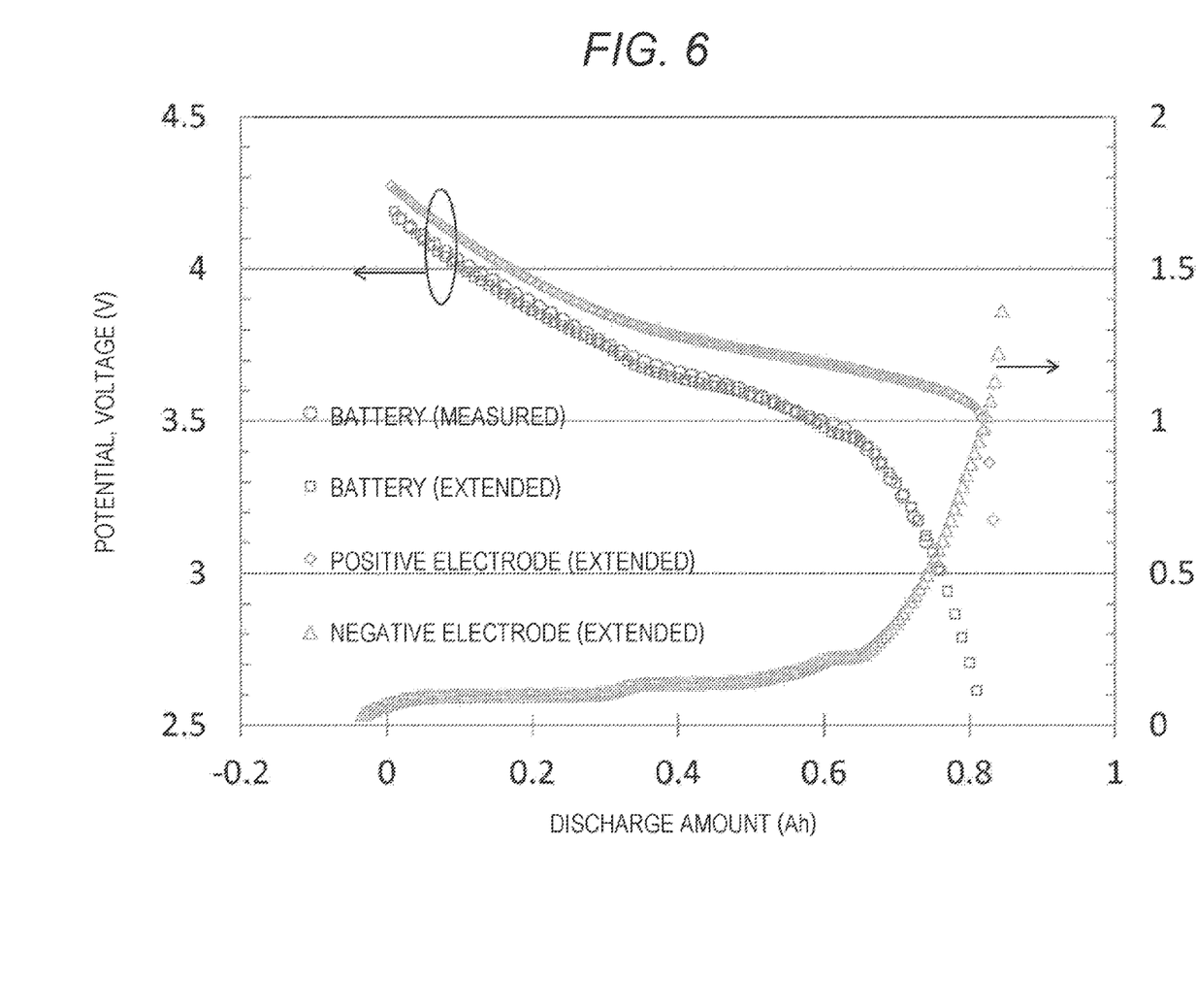
FIG. 6 illustrates data tables of a voltage of a secondary battery in an embodiment of the present invention.
Figure 7:
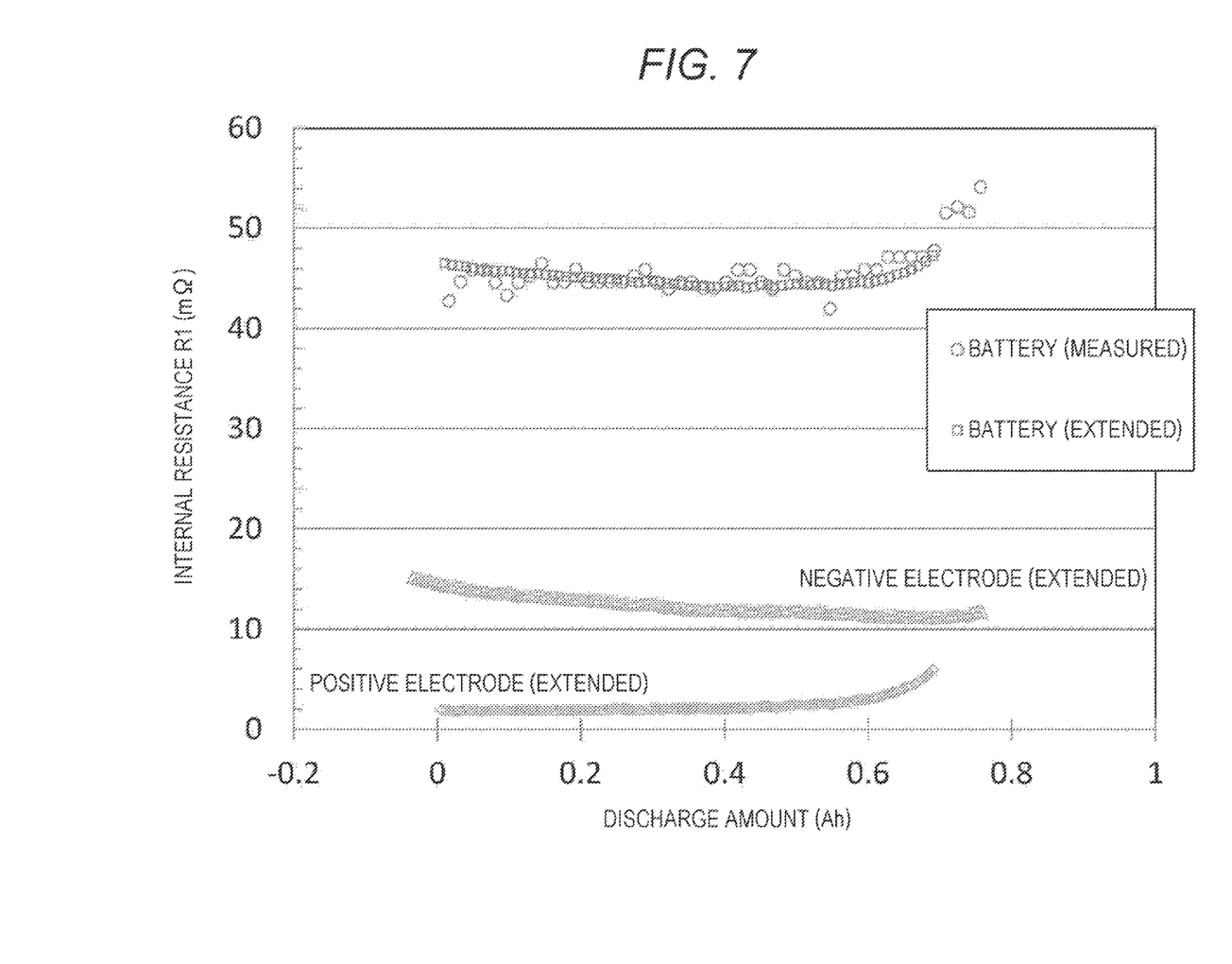
FIG. 7 illustrates data tables of an internal resistance of a secondary battery in an embodiment of the present invention.
Figure 8:
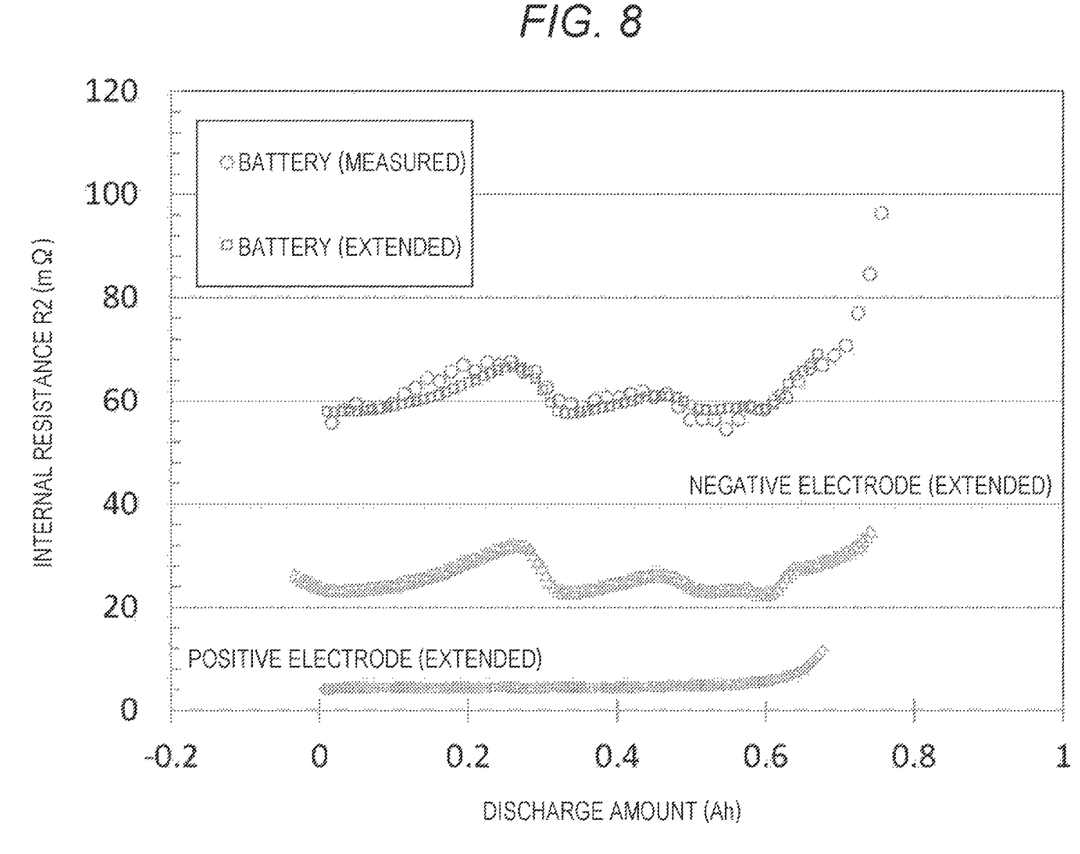
FIG. 8 illustrates data tables of another internal resistance of a secondary battery in an embodiment of the present invention.

FIG. 6 illustrates comparison between the measured data table and the extended data table, about the SOC and the open circuit voltage of the secondary battery, the open circuit potential of the positive electrode, and the open circuit potential of the negative electrode. In FIG. 6, the SOC are expressed by a discharge amount from a fully charged state. Further, FIG. 7 illustrates comparison between the measured data table and the extended data table, about the SOC and the internal resistance R1 of the secondary battery, the internal resistance $ap*Rp1$ of the positive electrode, and the internal resistance $an*Rn1$ of the negative electrode. Further, FIG. 8 illustrates comparison between the measured data table and the extended data table, about the SOC and the internal resistance R2 of the secondary battery, the internal resistance $ap*Rp2$ of the positive electrode, and the internal resistance $an*Rn2$ of the negative electrode. As illustrated in FIGS. 6 to 8, the extended data table based on the present invention is extremely favorably matched with the measured data table of the secondary battery, and the open circuit potentials and the internal resistances of the positive and negative electrodes can be accurately grasped. The secondary battery is controlled by the method described in the first embodiment, based on the extended data table.

According to the above description, the control of the secondary battery based on the positive and negative electrode potentials of the secondary battery during charge or discharge can be performed. Accordingly, it becomes possible to use the secondary battery while reliably avoiding a positive electrode potential region and a negative electrode potential region in which the characteristic deterioration and a decrease in safety of the secondary battery are accelerated, and the high safety and life prolongation of the secondary battery can be realized.

Hereinafter, control of when a secondary battery is further charged in a SOC where an open circuit voltage of the secondary battery is 4.189 V will be exemplarily described. Table 1 illustrates comparison of the control parameters according to the present embodiment with control parameters according to conventional control.

TABLE 1

|  | Second embodiment | First comparative example | Second comparative example |
|---|---|---|---|
| Open circuit voltage (V) | 4.189 | 4.189 | 4.189 |
| Internal resistance (ls) (mΩ) | 46.6 | 46.6 | 46.6 |
| Positive electrode open circuit potential (V) | 4.265 | 4.265 | Unknown |
| Negative electrode open circuit potential (V) | 0.076 | 0.076 | Unknown |
| Internal resistance r0 other than positive and negative electrodes (mΩ) | 30.3 | Unknown | Unknown |
| Positive electrode, internal resistance (ls) (mΩ) | 1.9 | Unknown | Unknown |
| Negative electrode internal resistance (ls) (mΩ) | 14.4 | Unknown | Unknown |

TABLE 1-continued

|  | Second embodiment | First comparative example | Second comparative example |
|---|---|---|---|
| Voltage (V) when 1 A is charged | 4.236 | 4.236 | 4.236 |
| Positive electrode potential (V) when 1 A is charged | 4.279 | 4.265-4.312 | Unknown |
| Negative electrode potential (V) when 1 A is charged | 0.062 | 0.076 or less | Unknown |
| Current (A) with which positive electrode potential becomes 4.3 V | 18.42 | 2.38 or more | Unknown |
| Current (A) with which negative electrode potential becomes 0 V | 5.28 | 1.63 or more | Unknown |

The first comparative example shows control parameters of when open circuit potentials of positive and negative electrodes with respect to an open circuit voltage of a second battery are identified by the method described in JP-2009-80093-A. The second comparative example shows control parameters in control based on an open circuit voltage and an internal resistance of a secondary battery, which are presently widely used. For the positive electrode open circuit potential, the negative electrode open circuit potential, the internal resistance r0 other than positive and negative electrodes, the positive electrode internal resistance, and the negative electrode internal resistance of Table 1, values corresponding to the open circuit voltage 4.189 V are extracted from the extended data tables illustrated in FIGS. 6 to 8 of the second embodiment and listed.

According to the present embodiment, for example, when a request to perform charge for one second with a current of 1.0 A is received, it can be found that the positive electrode potential of this case is $4.265+(1.9/1000)*1.0=4.279$ V, and the negative electrode potential is $0.076-(14.4/1000)*1.0=0.062$ V. By comparison between these values and a predetermined threshold, availability of charge can be determined. Meanwhile, in the first comparative example, the internal resistances of the positive and negative electrodes are unknown, and it is only known that the internal resistances are the internal resistance of the secondary battery or less. Therefore, it is only known that the positive electrode potential comes between 4.265 V to $4.265+(46.6/1000)*1.0=4.312$ V, and determination accuracy is inferior to that of the present embodiment. Similarly, it is only known that the negative electrode potential comes between 0.076 V to $0.076-(46.6/1000)*1.0=0.029$ V. Further, in the second comparative example, the open circuit potentials of the positive and negative electrodes are also unknown. Therefore, information about the potentials of the positive and negative electrodes during charge cannot be obtained, and highly accurate control, based on the information, is not possible.

Further, according to the present embodiment, for example, when an upper limit of the positive electrode potential is determined to be 4.3 V, and a lower limit of the negative electrode potential is determined to be 0 V, a current value to reach these upper limit and lower limit, that is, a maximum value of the current value that can be conducted to the secondary battery can be estimated. In the present embodiment, a current with which the positive electrode potential becomes 4.3 V after one second of charge is $(4.3-4.265)/(1.9/1000)=18.42$ A, and a current with which the negative electrode potential becomes 0 V is $(0.076-0)/(14.4/1000)=5.28$ A. Therefore, it can be found that the maximum conductive current value is 5.28 A. Meanwhile, in the first comparative example, the internal resistances of the positive and negative electrodes are unknown, and it is only known that the internal resistances are the internal resistance of the secondary battery or less. Therefore, a current with which the positive electrode potential becomes 4.3 V after one second of charge is $(4.3-4.265)/(46.6/1000)=2.38$ A or more, and a current with which the negative electrode potential becomes 0 V is $(0.076-0)/(46.6/1000)=1.63$ A. Therefore, the maximum conductive current value becomes 2.38 A. Further, in the second comparative example, the open circuit potentials of the positive and negative electrodes are also unknown. Therefore, the maximum current value based on the potentials of the positive and negative electrodes during charge cannot be obtained, and highly accurate control based on the information is not possible.

What is claimed is:

1. A method of controlling a secondary battery, the method comprising:
   determining a maximum value of a positive electrode potential and a minimum value of a negative electrode potential during charge of the secondary battery, or a minimum value of the positive electrode potential and a maximum value of the negative electrode potential during discharge of the secondary battery, based on potentials of a positive electrode and a negative electrode in an open circuit state corresponding to a SOC of the secondary battery, and internal resistances of the positive electrode and the negative electrode corresponding to the SOC of the secondary battery, and
   controlling a current, an input, or an output of the secondary battery such that at least one of the positive electrode potential and the negative electrode potential falls within a predetermined range.

2. The method of controlling the secondary battery according to claim 1, wherein the current, the input, or the output of the secondary battery is controlled such that an index calculated using a charge time or discharge time of the secondary battery, and at least one of the positive electrode potential and the negative electrode potential during charge or discharge falls within the predetermined range.

3. The method of controlling the secondary battery according to claim 1, wherein the internal resistances of the positive electrode and the negative electrode of the secondary battery are input as a data table or a function associated with the SOC of the secondary battery, and the maximum value of the positive electrode potential and the minimum value of the negative electrode potential during charge of the secondary battery, or the minimum value of the positive electrode potential and the maximum value of the negative electrode potential during discharge of the secondary battery are determined according to the SOC of the secondary battery, based on the data table or the function.

4. The method of controlling the secondary battery according to claim 1, wherein a data table or a function indicating correspondence between the SOC of the secondary battery and the internal resistances of the positive electrode and the negative electrode is generated and input by comparison between reference data tables or reference functions indicating a relationship between a SOC and the internal resistance of the positive electrode alone and of the negative electrode alone, and a data table or a function indicating correspondence between the SOC of the secondary battery and an internal resistance of the secondary battery, and
   the maximum value of the positive electrode potential and the minimum value of the negative electrode potential during charge of the secondary battery, or the minimum value of the positive electrode potential and the maximum value of the negative electrode potential during discharge of the secondary battery are determined based on the data table or the function indicating correspondence between the SOC of the secondary battery and the internal resistances of the positive electrode and the negative electrode.

5. The method of controlling the secondary battery according to claim 1, wherein a reference data table or a reference function indicating a relationship between a SOC and the internal resistance of the positive electrode alone is a combination or a relational expression of a SOC xp of the positive electrode alone and an internal resistance Rp of the positive electrode alone, a reference data table or a reference function indicating a relationship between a SOC and the internal resistance of the negative electrode alone is a combination or a relational expression of a SOC xn of the negative electrode alone and an internal resistance Rn of the negative electrode alone, a data table or a function indicating correspondence between the SOC of the secondary battery and an internal resistance of the secondary battery is a combination or a relational expression of a SOC x of the secondary battery and an internal resistance R of the secondary battery, and by performing of comparison between the reference data tables or reference functions of the positive electrode alone and the negative electrode alone, and the data table or the function of the secondary battery, using:

$$x = xp*mp + dp = xn*mn + dn,\text{ and}$$

$$R(x) = r0 + ap*Rp(xp) + an*Rn(xn),$$

using coefficients mp, mn, dp, dn, r0, ap, and an, values of the coefficients mp, mn, dp, dn, r0, ap, and an are determined, and a combination or a relational expression of the SOC x of the secondary battery, an internal resistance ap*rp of the positive electrode, and an internal resistance an*rn of the negative electrode, the combination or the relational expression being a data table or a function indicating correspondence between the SOC of the secondary battery and the internal resistances of the positive electrode and the negative electrode, is generated and input, and the maximum value of the positive electrode potential and the minimum value of the negative electrode potential during charge of the secondary battery, or the minimum value of the positive electrode potential and the maximum value of the negative electrode potential during discharge of the secondary battery are determined based on the data table or the function indicating correspondence between the SOC of the secondary battery and the internal resistances of the positive electrode and the negative electrode.

* * * * *